United States Patent [19]
Kohno

[11] Patent Number: 5,892,626
[45] Date of Patent: Apr. 6, 1999

[54] ZOOM LENS SYSTEM

[75] Inventor: Tetsuo Kohno, Toyonaka, Japan

[73] Assignee: Minolta Co., Ltd., Osaka, Japan

[21] Appl. No.: 794,628

[22] Filed: Feb. 3, 1997

[30] Foreign Application Priority Data

Feb. 8, 1996 [JP] Japan .................................. 8-022884

[51] Int. Cl.⁶ .................................................. G02B 15/14
[52] U.S. Cl. ........................... 359/676; 359/683; 359/690
[58] Field of Search ........................... 359/690, 686–687, 359/683, 676

[56] References Cited

U.S. PATENT DOCUMENTS

| | | | |
|---|---|---|---|
| 5,042,927 | 8/1991 | Ogawa et al. | 359/676 |
| 5,189,557 | 2/1993 | Endo | 359/683 |
| 5,396,367 | 3/1995 | Ono et al. | 359/687 |
| 5,557,470 | 9/1996 | Shibayama | 359/687 |

FOREIGN PATENT DOCUMENTS

| | | |
|---|---|---|
| 2207210 | 8/1991 | Japan . |
| 496012 | 3/1992 | Japan . |

*Primary Examiner*—Georgia Epps
*Assistant Examiner*—Jordan M. Schwartz
*Attorney, Agent, or Firm*—Price, Gess & Ubell

[57] ABSTRACT

A zoom lens system is provided with a first lens unit, a second lens unit, and a succeeding lens unit. The first lens unit has a positive refractive power. The second lens unit has a negative refractive power. The succeeding lens unit has a positive refractive power. During zooming from the wide angle limit to the telephoto limit, the first and second lens units move toward the object side so that the distance therebetween is increased. When f1 is a focal length of the first lens unit, f2 is a focal length of the second lens unit, fw is a focal length of the entire zoom lens system at the wide angle limit, LBW is a back focal length at the wide angle limit, and Ymax is ½ of a diagonal length of an image plane, the following conditions are satisfied by the zoom lens system:

$2.0 < f1/fw < 4.0$ $-0.90 < f2/fw < -0.30$ $0.85 < LBW/Ymax < 1.30$

5 Claims, 4 Drawing Sheets

FNO = 4.60

-0.5  0.5
SPHERICAL  SINE
ABERRATION  CONDITION

— d
----- SC

Y' = 17.2

-0.5  0.5
ASTIGMATISM

----- DM
— DS

Y' = 17.2

-5.0  5.0
DISTORTION %

FNO = 6.20

-0.5  0.5
SPHERICAL  SINE
ABERRATION  CONDITION

— d
----- SC

Y' = 17.2

-0.5  0.5
ASTIGMATISM

----- DM
— DS

Y' = 17.2

-5.0  5.0
DISTORTION %

FNO = 7.20

-0.5  0.5
SPHERICAL  SINE
ABERRATION  CONDITION

— d
----- SC

Y' = 17.2

-0.5  0.5
ASTIGMATISM

----- DM
— DS

Y' = 17.2

-5.0  5.0
DISTORTION %

FIG. 4A
FNO=4.60
FIG. 4B
Y'=17.2
FIG. 4C
Y'=17.2
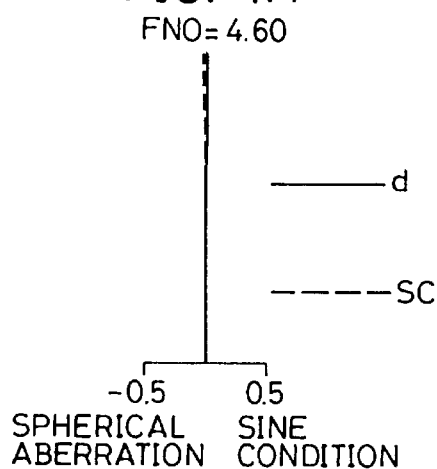
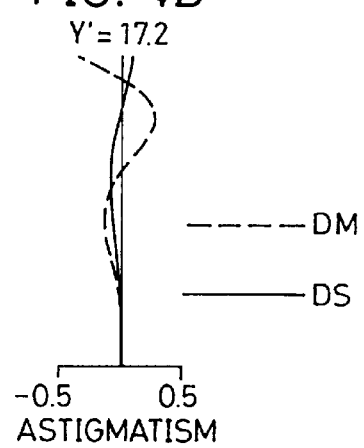
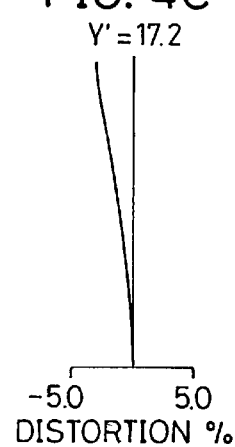
-0.5  0.5
SPHERICAL  SINE
ABERRATION  CONDITION
-0.5  0.5
ASTIGMATISM
-5.0  5.0
DISTORTION %
FIG. 4D
FNO=6.20
FIG. 4E
Y'=17.2
FIG. 4F
Y'=17.2
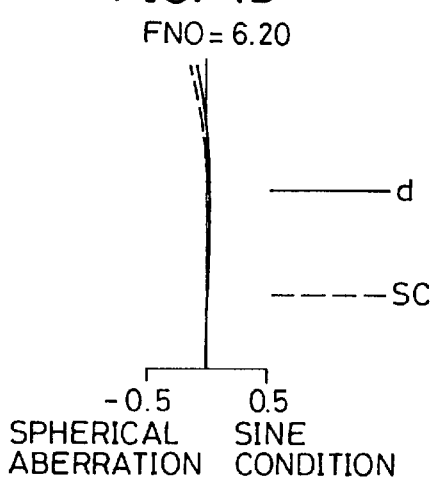
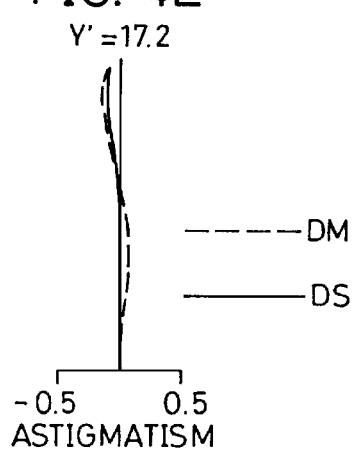
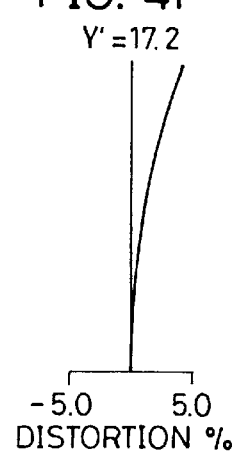
-0.5  0.5
SPHERICAL  SINE
ABERRATION  CONDITION
-0.5  0.5
ASTIGMATISM
-5.0  5.0
DISTORTION %
FIG. 4G
FNO=7.20
FIG. 4H
Y'=17.2
FIG. 4I
Y'=17.2
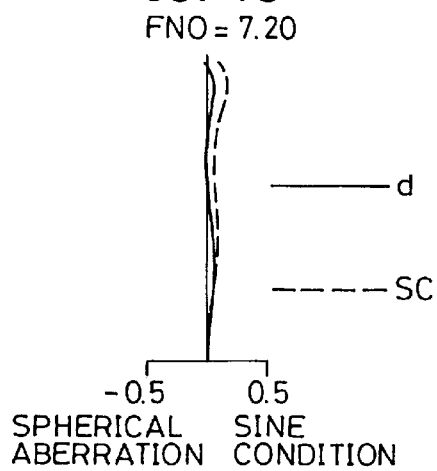
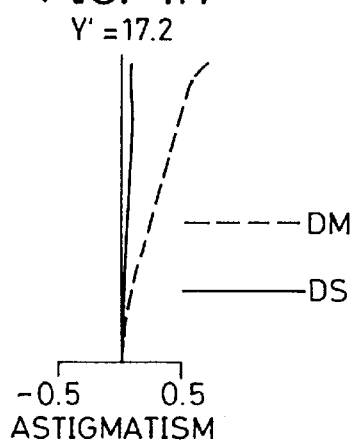
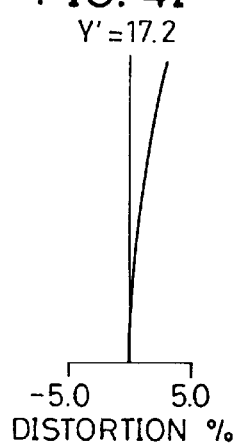
-0.5  0.5
SPHERICAL  SINE
ABERRATION  CONDITION
-0.5  0.5
ASTIGMATISM
-5.0  5.0
DISTORTION %

ZOOM LENS SYSTEM

BACKGROUND OF THE INVENTION

1. Field of the Invention

The present invention relates to a zoom lens system.

2. Description of the Prior Art

A single-lens reflex camera has been well known which is structured so that the user views through the finder a luminous flux having passed through the zoom lens system and reflected by a reflecting mirror (hereinafter, referred to as TTL (through-the-lens) mirror). In the conventional single-lens reflex camera, the TTL mirror and the shutter are disposed between the zoom lens system and the image receiving plane such as film or a light receiving device. That is, in the conventional single-lens reflex camera, space for the TTL mirror and the shutter is necessary between the zoom lens system and the image receiving plane. This has been an obstacle to the size reduction of the single-lens reflex camera.

A conceivable way to reduce the size of the single-lens reflex camera is to incorporate in the zoom lens system the shutter which is disposed between the zoom lens system and the image receiving plane in the conventional single-lens reflex camera.

By doing so, the size of the single-reflex camera may be reduced because only space for the TTL mirror is necessary between the zoom lens system and the image receiving plane. However, the conventional zoom lens system is designed to have a back focal length (the distance between the vertex of the most image side surface of the lens system and the image plane) suitable for the conventional single-lens reflex camera where the TTL mirror and the shutter are disposed between the zoom lens system and the image receiving plane. For this reason, by merely incorporating the shutter in the zoom lens system, the distance between the zoom lens system and the image receiving plane cannot be reduced, so that the size reduction of the single-lens reflex camera cannot be achieved.

SUMMARY OF THE INVENTION

An object of the present invention is to provide a zoom lens system having a back focal length suitable for reducing the size of the single-lens reflex camera.

To achieve the above-mentioned object, a zoom lens system of the present invention is provided with from an object side a first lens unit or group having a positive refractive power, a second lens unit or group having a negative refractive power, and a succeeding lens unit or group having a positive refractive power. During zooming from a wide angle limit to a telephoto limit, the first lens unit and the second lens unit move toward the object side while increasing a distance therebetween. The zoom lens system fulfills the following conditions:

$2.0 < f1/fw < 4.0$ $-0.90 < f2/fw < -0.30$ $0.85 < LBW/Ymax < 1.30$ where f1 is a focal length of the first lens unit, f2 is a focal length of the second lens unit, fw is a focal length of the entire zoom lens system at the wide angle limit, LBW is a back focal length at the wide angle limit, and Ymax is ½ of a diagonal length of an image plane.

BRIEF DESCRIPTION OF THE DRAWINGS

This and other objects and features of this invention will become clear from the following description, taken in conjunction with the preferred embodiments with reference to the accompanied drawings in which:

FIGS. 4A to 4I show aberration curves of the second embodiment of the present invention.

DESCRIPTION OF THE PREFERRED EMBODIMENTS

Figure 1:
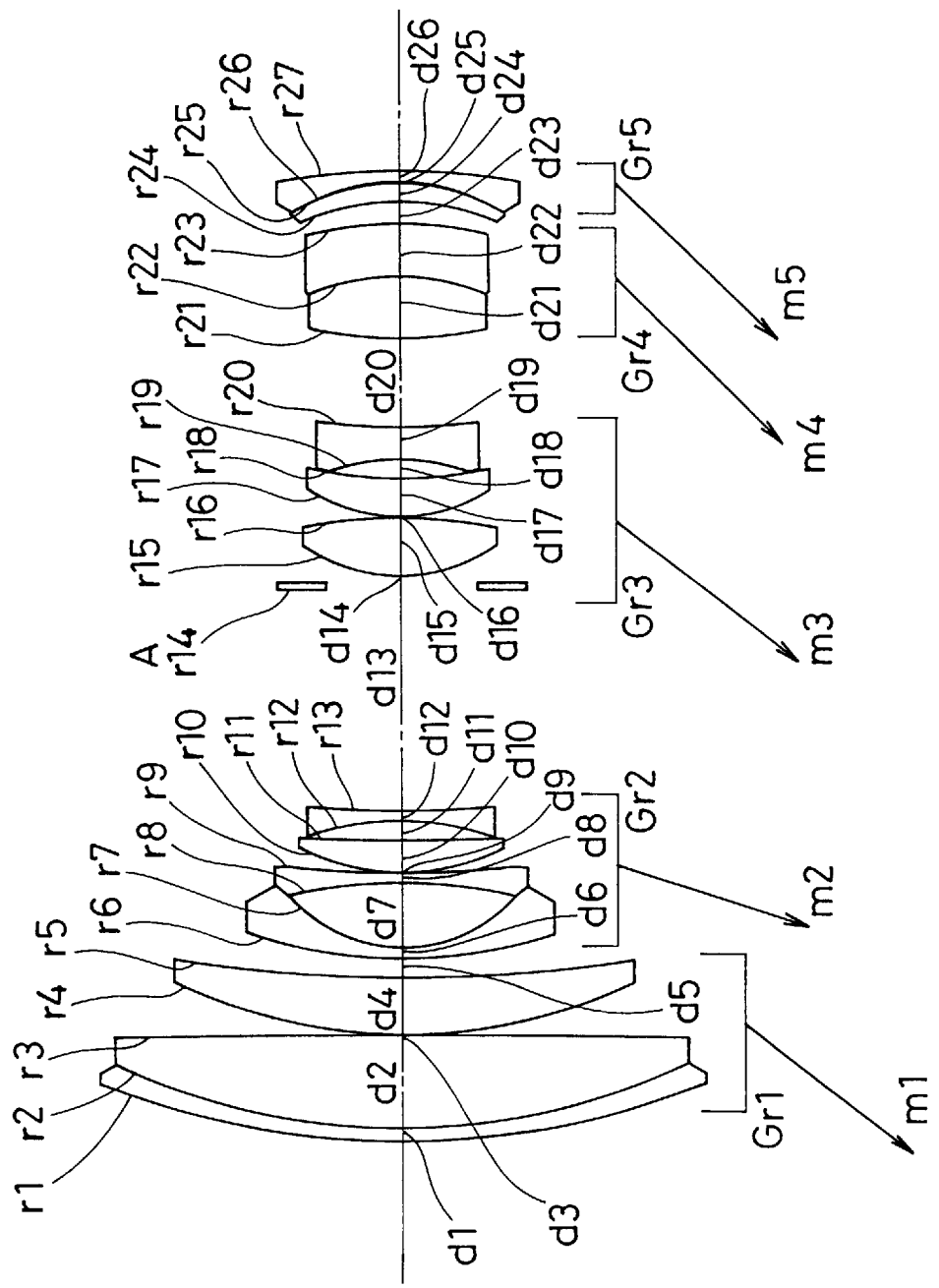
FIG. 1 shows the lens arrangement of a first embodiment of the present invention.
Figure 2:
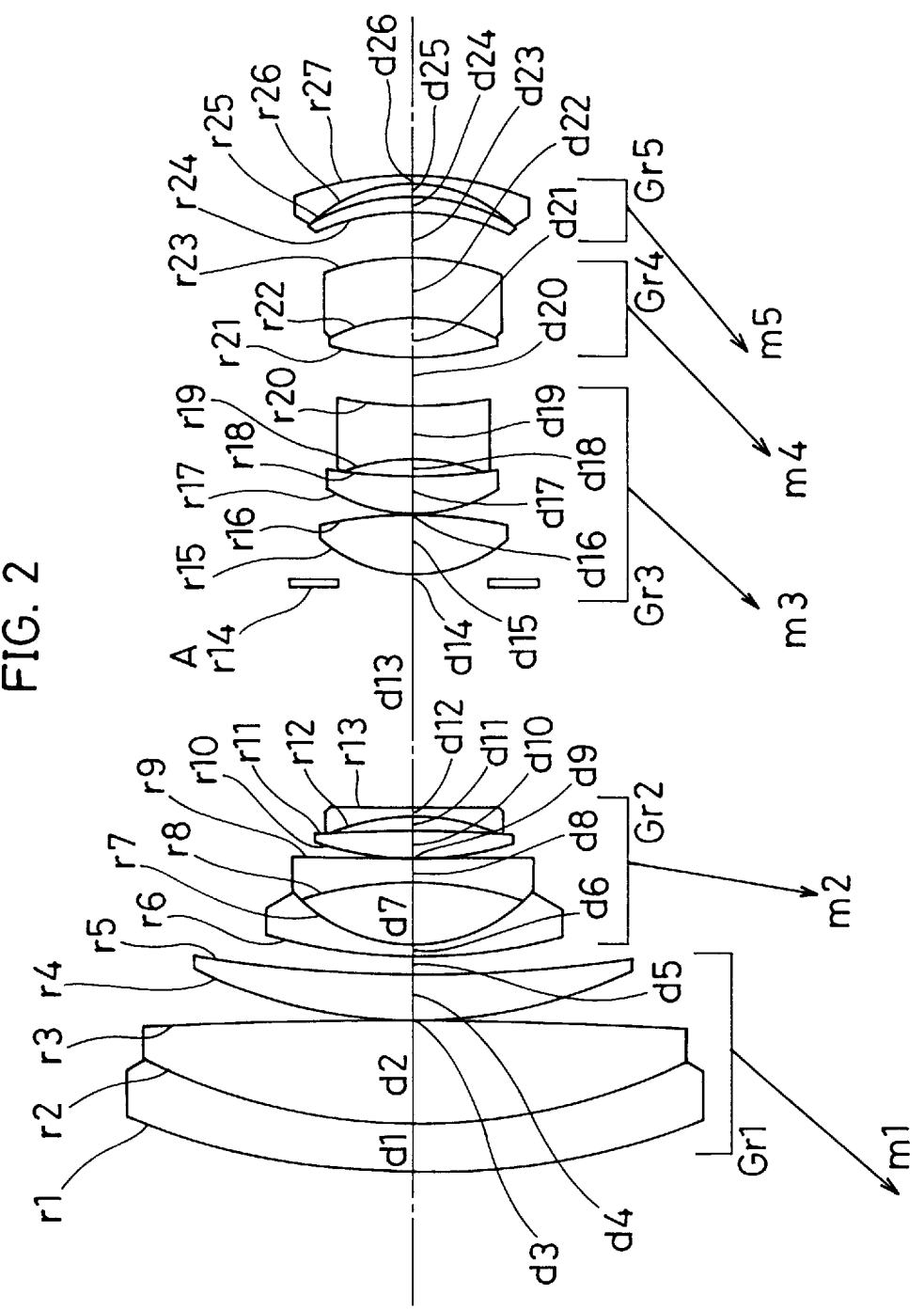
FIG. 2 shows the lens arrangement of a second embodiment of the present invention.
Figure 3A:
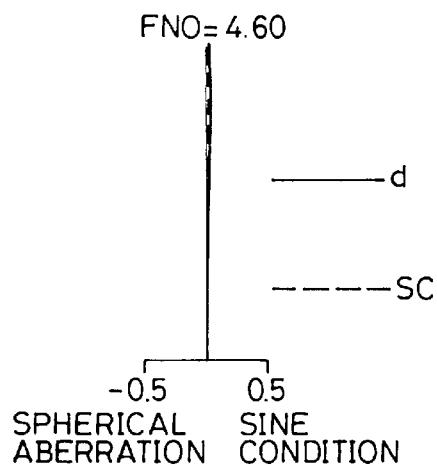
FIGS. 3A to 3I show aberration curves of the first embodiment of the present invention.
Figure 3B:
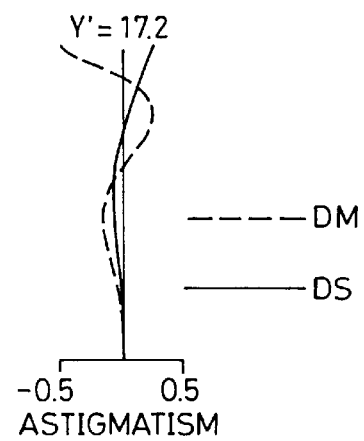
Figure 3C:
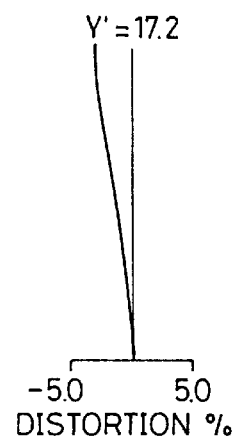
Figure 3D:
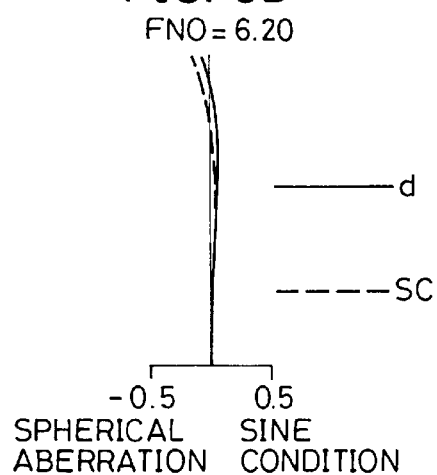
Figure 3E:
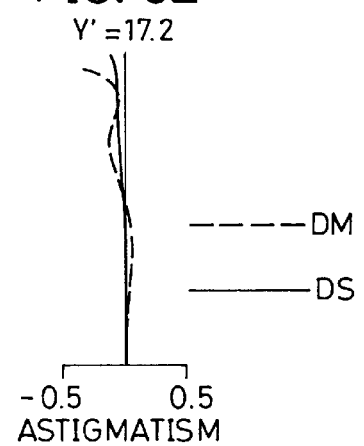
Figure 3F:
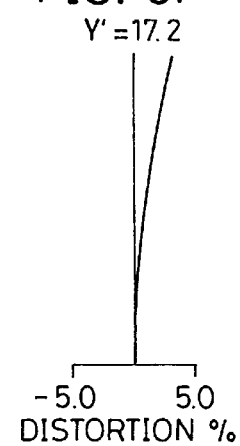
Figure 3G:
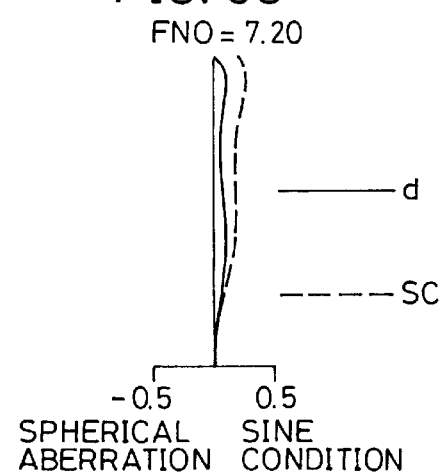
Figure 3H:
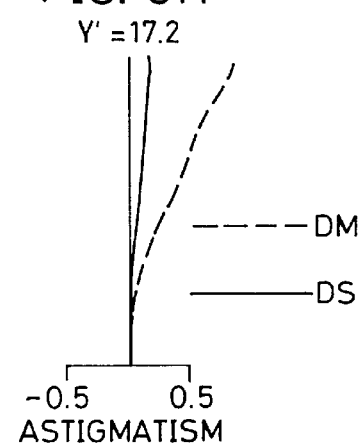
Figure 3I:
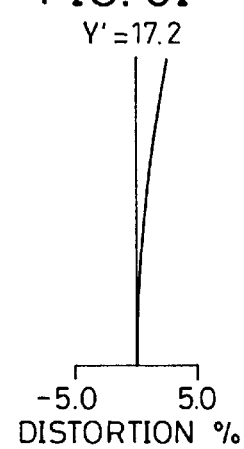

FIGS. 1 and 2 show the lens arrangements of first and second embodiments at the wide angle limit (W). Arrows m1 to m5 in the figures schematically show the movements of first to fifth lens units Gr1 to Gr5 from the wide angle limit (W) to the telephoto limit (T).

The first embodiment of the present invention is constituted of, from the object side, a first lens unit Gr1 having a positive refractive power, a second lens unit Gr2 having a negative refractive power, a third lens unit Gr3 having a positive refractive power, a fourth lens unit Gr4 having a positive refractive power, and a fifth lens unit Gr5 having a negative refractive power. The third to fifth lens units Gr3 to Gr5 correspond to the succeeding lens unit. The first lens unit Gr1 is composed of a doublet lens of a first lens element L1 which is a negative meniscus lens convex to the object side and a second lens element L2 which is a positive bi-convex lens, and a third lens element L3 which is a positive meniscus lens convex to the object side. The second lens unit Gr2 is composed of a fourth lens element L4 which is a negative meniscus lens convex to the object side, a fifth lens element L5 which is a negative bi-concave lens, a sixth lens element L6 which is a positive meniscus lens convex to the object side, and a seventh lens element L7 which is a negative bi-concave lens. The third lens unit Gr3 is composed of an aperture diaphragm A, an eighth lens element L8 which is a positive bi-convex lens, a ninth lens element L9 which is a positive meniscus lens convex to the object side, and a tenth lens element L10 which is a negative bi-concave lens. The fourth lens unit Gr4 is composed of a doublet lens of an eleventh lens element L11 which is a positive bi-convex lens and a twelfth lens element L12 which is a negative meniscus lens concave to the object side. The fifth lens unit Gr5 is composed of a thirteenth lens element L13 which is a positive meniscus lens concave to the object side, and a fourteenth lens element L14 which is a negative meniscus lens concave to the object side.

The second embodiment of the present invention is constituted of, from the object side, a first lens unit Gr1 having a positive refractive power, a second lens unit Gr2 having a negative refractive power, a third lens unit Gr3 having a positive refractive power, a fourth lens unit Gr4 having a positive refractive power, and a fifth lens unit Gr5 having a negative refractive power. The third to fifth lens units Gr3 to Gr5 correspond to the succeeding lens unit. The first lens unit Gr1 is composed of a doublet lens of a first lens element L1 which is a negative meniscus lens convex to the object side and a second lens element L2 which is a positive bi-convex lens, and a third lens element L3 which is a positive meniscus lens convex to the object side. The second lens unit Gr2 is composed of a fourth lens element L4 which is a negative meniscus lens convex to the object side, a fifth lens element L5 which is a negative bi-concave lens, a sixth lens element L6 which is a positive bi-convex lens, and a seventh lens element L7 which is a negative meniscus lens concave to the object side. The third lens unit Gr3 is composed of an aperture diaphragm A, an eighth lens element L8 which is a positive bi-convex lens, a ninth lens element L9 which is a positive meniscus lens convex to the object side, and a tenth lens element L10 which is a negative bi-concave D lens. The fourth lens unit Gr4 is composed of a doublet lens of an eleventh lens element L11 which is a positive bi-convex lens and a twelfth lens element L12 which is a negative meniscus lens concave to the object side. The fifth lens unit Gr5 is composed of a thirteenth lens element L13 which is a positive meniscus lens concave to the object side, and a fourteenth lens element L14 which is a negative meniscus lens concave to the object side.

In both of the first and second embodiments, zooming from the wide angle limit to the telephoto limit is performed by moving the first to fifth lens units Gr1 to Gr5 toward the object side. In doing so, the distance between the first and second lens units Gr1 and Gr2 increases, the distance between the second and third lens units Gr2 and Gr3 decreases, and the distance between the third and fourth lens units Gr3 and Gr4 decreases. The distance between the fourth and fifth lens units Gr4 and Gr5 are longest at a middle focal length condition.

According to the present invention, the distance between the first and second lens units Gr1 and Gr2 is shortest at the wide angle limit. For this reason, the refractive power arrangement of the entire lens system is of retro-type at the wide angle limit, so that a necessary back focal length is secured. On the other hand, because the distance between the first and second lens units Gr1 and Gr2 is longest at the telephoto limit, the refractive power arrangement of the entire lens system is of telephoto-type at the telephoto limit, so that the total length of the lens system at the telephoto limit is reduced.

Moreover, according to the present invention, the succeeding lens unit whose overall refractive power is positive includes a negative lens unit and during zooming from the wide angle limit to the telephoto limit, the distance between the second lens unit Gr2 and the succeeding lens unit decreases. Consequently, the distance between the second lens unit Gr2 and the succeeding lens unit increases at the wide angle limit, so that the refractive power arrangement of the entire lens system is of retro-type. As a result, a necessary back focal length is secured at the wide angle limit. On the other hand, because the distance between the second lens unit Gr2 and the succeeding lens unit is shortest at the telephoto limit, the size at the telephoto limit is reduced. Moreover, by disposing a negative lens unit in the succeeding lens unit so that the refractive power arrangement of the succeeding lens unit is of telephoto-type, the back focal length is prevented from being unnecessarily long.

The first and second embodiments both fulfill the following conditions (1) to (6):

$$2.0 < f1/fw < 4.0 \tag{1}$$

$$-0.90 < f2/fw < -0.30 \tag{2}$$

$$0.85 < LBW/Ymax < 1.30 \tag{3}$$

$$0.8 < |fw_{1-2}/fwB| < 1.3 \tag{4}$$

$$0.5 < LBW/fw < 1.1 \tag{5}$$

$$-0.8 < fBP/fBN < -0.25 \tag{6}$$

where f1 is a focal length of the first lens unit, f2 is a focal length of the second lens unit, fw is a focal length of the entire zoom lens system at the wide angle limit, LBW is a back focal length at the wide angle limit, Ymax is ½ of the diagonal length of the image plane, $fw_{1-2}$ is a composite focal length of the first and second lens units at the wide angle limit, fwB is a composite focal length of the succeeding lens unit at the wide angle limit, fBP is a focal length, at the wide angle limit, of a lens unit situated on the object side of the negative lens unit in the succeeding lens unit, and fBN is a focal length of the negative lens unit in the succeeding lens unit.

The conditions (1) and (2) are conditions for the first and second lens units Gr1 and Gr2 to have appropriate refractive power. When the upper limit of the condition (1) is exceeded, the refractive power of the first lens unit Gr1 is too weak, so that the total length of the lens system at the telephoto side increases. When the lower limit of the condition (1) is exceeded, the refractive power of the first lens unit Gr1 is too strong. Although this is advantageous in reducing the total length, the aperture of the front lens must be increased in order to secure a necessary off-axial luminous flux on the wide angle side, and aberration correction is difficult. When the upper limit of the condition (2) is exceeded, the refractive power of the second lens unit GR2 is too weak, so that the aperture of the front lens must be increased in order to secure a necessary off-axial luminous flux on the wide angle side. When the lower limit of the condition (2) is exceeded, the Petzval sum is excessively negative, so that correction of astigmatism and field of curvature is difficult.

The condition (3) is a condition for the lens system to have an appropriate back focal length. When the upper limit of the condition (3) is exceeded, the back focal length is too long, so that the total length increases. When the lower limit of the condition (3) is exceeded, the back focal length is too short, so that it is difficult to secure space for the TTL mirror.

The condition (4) defines a ratio of the composite focal length of the first and second lens units Gr1 and Gr2 to the composite focal length of the succeeding lens unit. When the upper limit of the condition (4) is exceeded, the composite refractive power of the first and second lens units Gr1 and Gr2 is too weak, so that the aperture of the front lens must be increased in order to secure a necessary ambient illuminance. In addition, because the back focal length is too short, it is difficult to secure space for the TTL mirror. When the lower limit of the condition (4) is exceeded, the composite refractive power of the first and second lens units Gr1 and Gr2 is too strong, so that the back focal length is too long. As a result, the total length of the lens system increases, and correction of aberrations, especially spherical aberration, is difficult. In addition, the outer aperture of the succeeding lens unit must be increased in order to secure a necessary f number.

The condition (5) is a condition for the lens system to have an appropriate back focal length at the wide angle limit. When the upper limit of the condition (5) is exceeded, the back focal length is too long, so that the total length increases. When the lower limit of the condition (5) is exceeded, the back focal length is too short, so that it is difficult to secure space for the TTL mirror.

The condition (6) is a condition for the succeeding lens unit to have an appropriate telephoto-type refractive power arrangement. When the upper limit of the condition (6) is exceeded, the refractive power of the positive lens units in the succeeding lens unit is too weak, so that the back focal length is too long. As a result, the total length increases. When the lower limit of the condition (6) is exceeded, the refractive power of the positive lens units is too strong, so that the back focal length is too short. As a result, it is difficult to secure scape for the TTL mirror, and correction of aberrations, especially spherical aberration, is difficult.

In the first and second embodiments, the back focal length is short compared to those of the conventional zoom lens systems for use in single-lens reflex cameras, so that the distance between the zoom lens system and the image receiving plane is reduced by incorporating the shutter in the zoom lens system. As a result, the size reduction of the single-lens reflex camera is achieved. In addition, in the first and second embodiments, the back focal length is long enough to dispose the TTL mirror. Therefore, the TTL mirror may be provided in a conventional lens shutter camera employing the first or the second embodiment. By doing so, the problem is solved of the parallax between the taking optical system and the finder optical system which problem is faced by conventional lens shutters.

Tables 1 and 2 show numerical data of the first and second embodiments, respectively. In the tables, ri (i=1, 2, 3, . . . ) represents a radius of curvature of an ith surface counted from L5 the object side, di (i=1, 2, 3, . . . ) is an ith axial distance counted from the object side, and Ni (i=1, 2, 3, . . . ) and vi (i=1, 2, 3, . . . ) are respectively a refractive index to the dline and an Abbe number of an ith lens counted from the object side. The tables also show focal lengths f and F numbers FNO of the entire lens system at the wide angle limit (W), at the middle focal length condition (M) and at the telephoto limit (T).

In the tables, surfaces marked with asterisks are aspherical and defined by the following expression (A) representing an aspherical surface configuration:

$$Y = \frac{C \cdot X^2}{1 + \sqrt{1 - \epsilon \cdot X^2 \cdot C^2}} + \sum_i Ai \cdot X^i \quad (A)$$

where
- X: height in the direction perpendicular to the optical axis;
- Y: displacement from the reference surface of the optical axis direction;
- C: paraxial curvature;
- $\epsilon$: quadric surface parameter;
- Ai: aspherical coefficient of the i-th order.

FIGS. 3A to 3I and 4A to 4I show aberration curves of the first and second embodiments. FIGS. 3A to 3C and 4A to 4C show aberration curves at the wide angle limit (shortest focal length condition). FIGS. 3D to 3F and 4D to 4F show aberration curves at the middle focal length condition. FIGS. 3G to 3I and 4G to 4I show aberration curves at the telephoto limit (longest focal length condition). In FIGS. 3A, 3D, 3G, 4A, 4D and 4G, the solid line d represents spherical aberration and the broken line SC represents sine condition. In FIGS. 3B, 3E, 3H, 4B, 4E and 4H, the broken line DM represents field of curvature of a meridional luminous flux and the solid line DS represents field of curvature of a sagittal luminous flux.

Table 5 shows values of the first and second embodiments with respect to the conditions (1) to (6).

According to the present invention, the back focal length is short compared to those of the conventional zoom lens systems for use in single-lens reflex cameras. For this reason, by incorporating the shutter in the zoom lens system of the present invention, the distance between the zoom lens system and the image receiving plane is reduced. As a result, the size reduction of the single-lens reflex camera is achieved.

Obviously, many modifications and variations of the present invention are possible in light of the above teachings. It is therefore to be understood that within the scope of the appended claims, the invention may be practiced other than as specifically described.

TABLE 1

<1st Embodiment>
f = 22.5~70.0~215.0   FNO = 4.6~6.2~7.2

| | Curvature Radius | | Axial Distance | | Refractive Coefficient | | Abbe Number |
|---|---|---|---|---|---|---|---|
| r1 | 71.859 | | | | | | |
| | | d1 | 0.882 | N1 | 1.83350 | v1 | 21.00 |
| r2 | 55.572 | | | | | | |
| | | d2 | 7.736 | N2 | 1.49310 | v2 | 83.58 |
| r3 | −2271.798 | | | | | | |
| | | d3 | 0.100 | | | | |
| r4 | 46.472 | | | | | | |
| | | d4 | 4.844 | N3 | 1.49310 | v3 | 83.58 |
| r5 | 115.339 | | | | | | |
| | | d5 | 1.717~24.130~41.976 | | | | |
| r6* | 45.349 | | | | | | |
| | | d6 | 0.800 | N4 | 1.77250 | v4 | 49.77 |
| r7 | 13.212 | | | | | | |
| | | d7 | 5.421 | | | | |
| r8 | −47.823 | | | | | | |
| | | d8 | 0.800 | N5 | 1.77250 | v5 | 49.77 |
| r9 | 98.400 | | | | | | |
| | | d9 | 0.135 | | | | |
| r10 | 20.531 | | | | | | |
| | | d10 | 2.553 | N6 | 1.83350 | v6 | 21.00 |
| r11 | 188.170 | | | | | | |
| | | d11 | 1.642 | | | | |
| r12 | −24.922 | | | | | | |
| | | d12 | 0.800 | N7 | 1.75450 | v7 | 51.57 |
| r13 | 79.319 | | | | | | |
| | | d13 | 19.123~8.367~0.700 | | | | |
| r14 | INF | | | | | | |
| | | d14 | 0.800 | | | | |
| r15 | 12.726 | | | | | | |
| | | d15 | 5.074 | N8 | 1.49310 | v8 | 83.58 |
| r16 | −37.243 | | | | | | |
| | | d16 | 0.100 | | | | |
| r17 | 15.914 | | | | | | |
| | | d17 | 3.245 | N9 | 1.49310 | v9 | 83.58 |
| r18 | 42.775 | | | | | | |
| | | d18 | 1.518 | | | | |
| r19* | −22.329 | | | | | | |
| | | d19 | 2.846 | N10 | 1.83400 | v10 | 37.05 |
| r20* | 148.898 | | | | | | |
| | | d20 | 7.257~1.491~0.300 | | | | |
| r21 | 34.202 | | | | | | |
| | | d21 | 5.317 | N11 | 1.48749 | v11 | 70.44 |
| r22 | −20.709 | | | | | | |
| | | d22 | 4.362 | N12 | 1.83350 | v12 | 21.00 |
| r23 | −27.977 | | | | | | |
| | | d23 | 1.642~2.757~1.843 | | | | |
| r24* | −36.504 | | | | | | |
| | | d24 | 1.562 | N13 | 1.84666 | v13 | 23.82 |
| r25* | −22.896 | | | | | | |
| | | d25 | 0.362 | | | | |
| r26 | −16.087 | | | | | | |
| | | d26 | 0.800 | N14 | 1.75450 | v14 | 51.57 |
| r27 | −51.853 | | | | | | |

[Aspherical Coefficients]

r6 : $\epsilon$ = 1.000000
A4 = 2.43320E−06
A6 = 5.70780E−08
A8 = −9.42970E−10
A10 = 6.00230E−12
A12 = −1.18920E−14
r19 : $\epsilon$ = 1.000000
A4 = −3.15820E−05
A6 = 2.41300E−07
A8 = 3.08370E−10
A10 = −2.08570E−11
A12 = −3.27240E−13
r20 : $\epsilon$ = 1.000000

TABLE 1-continued

```
A4 = 5.74230E-05
A6 = 4.71020E-07
A8 = 1.81900E-09
A10 = 4.43630E-11
A12 = 1.17940E-12
r24 : ε = 1.000000
A4 = -4.79240E-05
A6 = -6.35260E-07
A8 = -7.00420E-09
A10 = 1.30140E-11
A12 = -2.04010E-13
r25 : ε = 1.000000
A4 = -2.64640E-05
A6 = -5.84840E-07
A8 = -2.19420E-09
A10 = -5.42080E-11
A12 = 2.31080E-13
```

TABLE 2

<2nd Embodiment>
f = 22.5~65.0~180.0   FNO = 4.6~6.2~7.2

| | Curvature Radius | | Axial Distance | Refractive Coefficient | | Abbe Number |
|---|---|---|---|---|---|---|
| r1 | 75.279 | | | | | |
| | | d1 | 4.968 | N1  1.83350 | v1 | 21.00 |
| r2 | 55.416 | | | | | |
| | | d2 | 8.947 | N2  1.49310 | v2 | 83.58 |
| r3 | -512.686 | | | | | |
| | | d3 | 0.100 | | | |
| r4 | 44.414 | | | | | |
| | | d4 | 4.157 | N3  1.49310 | v3 | 83.58 |
| r5 | 126.646 | | | | | |
| | | d5 | 1.625~18.481~34.061 | | | |
| r6* | 60.711 | | | | | |
| | | d6 | 0.800 | N4  1.77250 | v4 | 49.77 |
| r7 | 13.775 | | | | | |
| | | d7 | 5.526 | | | |
| r8 | -33.501 | | | | | |
| | | d8 | 2.038 | N5  1.77250 | v5 | 49.77 |
| r9 | 215.933 | | | | | |
| | | d9 | 0.100 | | | |
| r10 | 30.409 | | | | | |
| | | d10 | 2.336 | N6  1.83350 | v6 | 21.00 |
| r11 | -112.342 | | | | | |
| | | d11 | 1.318 | | | |
| r12 | -22.009 | | | | | |
| | | d12 | 0.800 | N7  1.75450 | v7 | 51.57 |
| r13 | -280.575 | | | | | |
| | | d13 | 20.047~8.423~0.700 | | | |
| r14 | INF | | | | | |
| | | d14 | 0.800 | | | |
| r15 | 12.798 | | | | | |
| | | d15 | 5.393 | N8  1.48749 | v8 | 70.44 |
| r16 | -37.624 | | | | | |
| | | d16 | 0.100 | | | |
| r17 | 15.789 | | | | | |
| | | d17 | 3.223 | N9  1.49310 | v9 | 83.58 |
| r18 | 43.126 | | | | | |
| | | d18 | 1.421 | | | |
| r19* | -22.264 | | | | | |
| | | d19 | 4.864 | N10  1.83400 | v10 | 37.05 |
| r20* | 55.782 | | | | | |
| | | d20 | 4.150~0.819~0.300 | | | |
| r21 | 28.225 | | | | | |
| | | d21 | 3.212 | N11  1.48749 | v11 | 70.44 |
| r22 | -17.438 | | | | | |
| | | d22 | 5.194 | N12  1.83350 | v12 | 21.00 |
| r23 | -24.791 | | | | | |
| | | d23 | 3.992~4.002~3.497 | | | |
| r24* | -25.545 | | | | | |
| | | d24 | 1.501 | N13  1.84666 | v13 | 23.82 |
| r25* | -19.053 | | | | | |
| | | d25 | 1.047 | | | |

TABLE 2-continued

| r26 | -13.411 | | | | | |
|---|---|---|---|---|---|---|
| | | d26 | 0.800 | N14  1.75450 | v14 | 51.57 |
| r27 | -27.078 | | | | | |

[Aspherical Coefficients]

```
r6 : ε = 1.000000
A4 = 6.86040E-06
A6 = 4.53160E-08
A8 = -9.42970E-10
A10 = 6.44550E-12
A12 = -1.39450E-14
r19 : ε = 1.000000
A4 = -2.96280E-05
A6 = 1.63090E-07
A8 = 6.05160E-10
A10 = -1.42200E-11
A12 = 3.99580E-13
r20 : ε = 1.000000
A4 = 5.32780E-05
A6 = 3.74210E-07
A8 = 1.05930E-09
A10 = 4.01210E-11
A12 = 1.15060E-12
r24 : ε = 1.000000
A4 = -5.32190E-05
A6 = -4.78520E-07
A8 = -2.98820E-09
A10 = 5.88690E-11
A12 = -2.60050E-13
r25 : ε = 1.000000
A4 = -3.84410E-05
A6 = -5.03660E-07
A8 = 1.56000E-09
A10 = -3.16550E-11
A12 = 1.89260E-13
```

TABLE 3

| | Condition | | | | | |
|---|---|---|---|---|---|---|
| | (1) | (2) | (3) | (4) | (5) | (6) |
| 1st Embodiment | 3.69 | -0.570 | 1.22 | 0.869 | 0.93 | -0.41 |
| 2nd Embodiment | 3.43 | -0.599 | 1.22 | 0.907 | 0.93 | -0.363 |

What is claimed is:

1. A zoom lens system comprising from an object side a first lens unit having a positive refractive power, a second lens unit having a negative refractive power, and a succeeding lens unit having a positive refractive power, wherein during zooming from a wide angle limit to a telephoto limit, said first lens unit and said second lens unit move toward the object side while increasing a distance therebetween, and wherein said zoom lens system fulfills the following conditions:

$$2.0 < f1/fw < 4.0$$

$$-0.90 < f2/fw < -0.30$$

$$0.85 < LBW/Ymax < 1.30$$

where f1 is a focal length of the first lens unit, f2 is a focal length of the second lens unit, fw is a focal length of the entire zoom lens system at the wide angle limit, LBW is a back focal length at the wide angle limit, and Ymax is ½ of a diagonal length of an image plane.

2. A zoom lens system as claimed in claim 1, wherein said succeeding lens unit comprises from the object side a third lens unit having a positive refractive power, a fourth lens unit having a positive refractive power, and a fifth lens unit having a negative refractive power.

3. A zoom lens system comprising from an object side:
a first lens group having a positive refractive power;
a second lens group having negative refractive power; and
a succeeding lens group having an overall positive refractive power, and including from the object side a first lens unit and a negative lens unit;
wherein during zooming from a wide angle limit to a telephoto limit, said first lens group and said second lens group move toward the object side while increasing a distance therebetween, and wherein said zoom lens system fulfills the following conditions:

$$2.0 < f1/fw < 4.0$$

$$0.8 < |fw_{1-2}/fwB| < 1.3$$

$$0.5 < LBW/fw < 1.1$$

$$-0.8 < fBP/fBN < -0.25$$

where:
 f1 is a focal length of the first lens group,
 f2 is a focal length of the second lens group,
 $fw_{1-2}$ is a composite focal length of the first lens group and the second lens group at the wide angle limit,
 fwB is a composite focal length of the succeeding lens group at the wide angle limit,
 fBP is a focal length, at the wide angle limit, of the first lens unit situated on the object side of the negative lens unit in the succeeding lens group,
 fBN is a focal length of the negative lens unit in the succeeding lens group,
 LBW is a back focal length at the wide angle limit, and
 fw is a focal length of the entire zoom lens system at the wide angle limit.

4. A zoom lens system as claimed in claim 3, wherein said succeeding lens group comprises from the object side a third lens unit having a positive refractive power, a fourth lens unit having a positive refractive power, and a fifth lens unit having a negative refractive power.

5. A zoom lens system comprising from an object side a first lens unit having a positive refractive power, a second lens unit having a negative refractive power, and a succeeding lens unit having a positive refractive power, wherein during zooming from a wide angle limit to a telephoto limit, said first lens unit and second lens unit move toward the object side while increasing a distance therebetween, and wherein said zoom lens system fulfills the following condition:

$$0.85 < LBW/Ymax < 1.30$$

where LBW is a back focal length at the wide angle limit, and Ymax is ½ of a diagonal length of an image plane.

* * * * *